United States Patent
Tsutsui et al.

(10) Patent No.: US 6,317,671 B1
(45) Date of Patent: Nov. 13, 2001

(54) CONTROL APPARATUS FOR AUTOMATIC TRANSMISSION

(75) Inventors: Hiroshi Tsutsui; Nobutada Saitou, both of Anjo (JP)

(73) Assignee: AISIN AW Co., Ltd., Anjo (JP)

( * ) Notice: Subject to any disclaimer, the term of this patent is extended or adjusted under 35 U.S.C. 154(b) by 0 days.

(21) Appl. No.: 09/556,794

(22) Filed: Apr. 25, 2000

(30) Foreign Application Priority Data

Apr. 26, 1999 (JP) .................................................. 11-118836
Apr. 26, 1999 (JP) .................................................. 11-118840

(51) Int. Cl.$^7$ .............................. G06F 7/00; G06F 17/00; G06F 19/00; F16H 61/00; F16H 59/00; B60K 41/02

(52) U.S. Cl. .......................... 701/51; 701/52–54; 701/67; 701/70; 701/78; 701/79; 477/125; 477/175; 477/80; 477/109; 477/93; 477/114; 477/901; 477/116; 477/117; 477/176; 477/155; 477/180

(58) Field of Search ................................. 701/51–54, 67, 701/70, 78, 79; 477/125, 175, 109, 80, 93, 114, 901, 116, 117, 176, 155, 180

(56) References Cited

U.S. PATENT DOCUMENTS

| | | | |
|---|---|---|---|
| 5,646,841 | * 7/1997 | Suzuki et al. | 364/424.098 |
| 5,649,880 | * 7/1997 | Tsutsui et al. | 477/125 |
| 5,690,581 | * 11/1997 | Nadayoshi et al. | 477/176 |
| 5,692,990 | * 12/1997 | Tsukamoto et al. | 477/93 |
| 5,741,200 | * 4/1998 | Taniguchi et al. | 477/93 |
| 5,788,603 | * 8/1998 | Tsutsui et al. | 477/116 |
| 5,800,308 | * 9/1998 | Tsutsui et al. | 477/116 |

* cited by examiner

Primary Examiner—William A. Cuchlinski, Jr.
Assistant Examiner—Ronnie Mancho
(74) Attorney, Agent, or Firm—Oliff & Berridge, PLC (57) ABSTRACT

A control apparatus for an automatic transmission capable of sufficiently producing the effect of neutral control by reducing a period of time from stop of a vehicle to the release of an input clutch. Vehicle stop prediction means for predicting immediate stop of the vehicle from a vehicle speed detected by a vehicle speed sensor is provided. Input clutch control means for reducing a hydraulic pressure in a hydraulic servo of the input clutch from a hydraulic pressure in a normal engagement state to a waiting pressure capable of maintaining an engagement state of the clutch based on the prediction of the stop of the vehicle by the vehicle stop prediction means is provided. The operation of releasing the input clutch concurrent with the neutral control is started from a state of the waiting pressure, so that the input clutch is released in a short period of time.

12 Claims, 10 Drawing Sheets

| | C1 | C2 | C3 | B1 | B2 | B3 | B4 | B5 | F1 | F2 |
|---|---|---|---|---|---|---|---|---|---|---|
| N | | | | | | | | ○ | | |
| 1ST | ○ | | | | | △ | | ○ | | ○ |
| 2ND | ○ | | | △ | ○ | | | ○ | ○ | |
| 3RD | ○ | | | △ | ○ | | ○ | | ○ | |
| 4TH | ○ | | ○ | △ | ○ | | | | ○ | |
| 5TH | ○ | ○ | ○ | | | | | | | |
| REV | | ○ | | | | ○ | | ○ | | |

○ : ENGAGEMENT  △ : AT THE TIME OF ENGINE BRAKING

FIG. 8 k1
A = 0.3*Time SPD0/sp0expect
B = 1.0*BRK_prs_ave/Vehicle_stop
C = 1.0*inRpmspd_ave/stop_acc_lim (if Time SPD0 >5 then A=1)
(if B >b_max then B=b_max)
(if C> c_max then C=c_max)

| Time SPD0 | BRK_prs | inRpm_spd | A | B | C | STOP_DET | STOP_LIM | JUDGEMENT |
|---|---|---|---|---|---|---|---|---|
| 1 | 5 | 1500 | 0.06 | 0.25 | 0.7 | 0.235 | 0.2 | OK |
| sp0expect | | | 5 | 0.3 | B*C | | | |
| Vehicle_stop | | | a_max | 0.7 | 0.18 | | | |
| stop_acc_lim | | | 20 | 0.7 | | | | |
| | | | b_max | | | | | |
| | | | 2000 | | | | | |
| | | | c_max | | | | | |

FIG. 9

CONTROL APPARATUS FOR AUTOMATIC TRANSMISSION

BACKGROUND OF THE INVENTION

1. Field of Invention

The invention relates to a control apparatus for an automatic transmission installed in a vehicle and, more particularly, to a control apparatus for an automatic transmission capable of performing neutral control.

2. Description of Related Art

In some known automatic transmissions for a vehicle, if the vehicle stops in a forward drive range, the control for releasing an input clutch (hereinafter referred to as "neutral control") is performed for the purpose of improving fuel consumption.

According to the related art, the clutch is released after the lapse of a predetermined length of time from a time when a vehicle speed detected by a vehicle speed sensor becomes zero, by estimating a time when the vehicle is definitely stopped.

However, during the aforementioned control, while the pressure of hydraulic fluid in a hydraulic servo of the input clutch needs to be reduced drastically from a normal line pressure to a release pressure, the hydraulic pressure needs to be released gently to prevent a shock from being caused when releasing the clutch. Therefore, it takes a long time until the operation is completed, and a time lag is generated from the stop of the vehicle to the actual release of the input clutch. As a result, the effect of the neutral control is lessened.

SUMMARY OF THE INVENTION

In consideration of the aforementioned circumstances, the invention aims at providing a control apparatus for an automatic transmission capable of sufficiently producing the effect of neutral control by reducing a period of time from stop of a vehicle to the release of an input clutch.

According to a first aspect of the invention, there is provided a control apparatus for an automatic transmission performing neutral control in which an input clutch for on-off controlling transmission of an engine driving force is released when a vehicle is stopped in a drive range, comprising a vehicle speed sensor for detecting a vehicle speed, vehicle stop prediction means for predicting immediate stop of the vehicle from the vehicle speed detected by the vehicle speed sensor, and input clutch control means for reducing a hydraulic pressure in a hydraulic servo of the input clutch from a hydraulic pressure in a normal engagement state to a predetermined waiting pressure capable of maintaining the engagement state of the input clutch, wherein an operation of releasing the input clutch concurrent with the neutral control is started from a state of the waiting pressure.

If the vehicle speed sensor detects that the vehicle speed has become equal to or lower than a predetermined speed, the vehicle stop prediction means predicts that the vehicle will stop soon. Based on the prediction of the stop of the vehicle, the input clutch control means reduces a hydraulic pressure in the hydraulic servo of the input clutch from a hydraulic pressure (a line pressure or the like) in a normal engagement state to a predetermined waiting pressure (Pwait) capable of maintaining the engagement state of the input clutch. The operation of releasing the input clutch concurrent with the neutral control is started from a state of the waiting pressure (Pwait), whereby the input clutch is released in a short period of time.

In the first aspect of the invention, because the operation of releasing the input clutch (the C1 clutch) concurrent with the neutral control can be started from the waiting pressure (Pwait) which is lower than the hydraulic pressure in the normal engagement state, the input clutch can be released in a short period of time. Thus, the period during which the engine driving force is not transmitted to the speed-change mechanism portion with the input clutch being released can be prolonged accordingly. As a result, fuel consumption improves, and it becomes possible to produce the effect of the neutral control.

The control apparatus may comprise a brake sensor for detecting the presence or absence of depression of a brake and may be structured such that the vehicle stop prediction means predicts stop of the vehicle from the presence or absence of depression of the brake detected by the brake sensor in addition to the vehicle speed detected by the vehicle speed sensor.

In this structure, the stop of the vehicle can be predicted in consideration of the depression of the brake detected by the brake sensor as well as the vehicle speed detected by the vehicle speed sensor. Thus, the stop of the vehicle can be predicted with high reliability.

The control apparatus may comprise a throttle opening degree sensor for detecting an opening degree of a throttle and may be structured such that the vehicle stop prediction means predicts stop of the vehicle from the opening degree of the throttle detected by the throttle opening degree sensor in addition to the vehicle speed detected by the vehicle speed sensor.

In this structure, the stop of the vehicle can be predicted in consideration of the throttle opening degree detected by the throttle opening degree sensor as well as the vehicle speed detected by the vehicle speed sensor. Thus, the stop of the vehicle can be predicted with high reliability.

The control apparatus may be structured such that the input clutch control means reduces a hydraulic pressure in the hydraulic servo of the input clutch from a line pressure to a predetermined waiting pressure capable of maintaining an engagement state of the input clutch.

In this structure, the hydraulic pressure in the input clutch is drastically reduced from the line pressure to the waiting pressure (Pwait), and the following operation of releasing the input clutch (the C1 clutch) can be smoothly performed in a short period of time.

The control apparatus may be structured such that the input clutch control means reduces a hydraulic pressure in the hydraulic servo of the input clutch from a hydraulic pressure in a normal engagement state to a predetermined waiting pressure based on a stall torque calculated from an engine at that moment.

In this structure, the hydraulic servo of the input clutch can be kept at the lowest hydraulic pressure capable of maintaining the engagement of the input clutch. Therefore, the following operation of releasing the input clutch (the C1 clutch) can be smoothly performed in a short period of time.

The control apparatus may comprise vehicle stop determination means and may be structured such that when the vehicle stop determination means determines that the vehicle has stopped, the operation of releasing the input clutch concurrent with the neutral control is started from a state of the waiting pressure.

In this structure, if the vehicle stop determination means determines that the vehicle has stopped, the input clutch is released from the waiting pressure. Thus, the neutral control can be entered in a short period of time.

The control apparatus may comprise a running state detection sensor capable of detecting a signal corresponding to a plurality of stop-degree estimating elements for estimating a stop-degree of the vehicle, stop-degree estimating parameter calculation means for calculating a corresponding stop-degree estimating element from the signal detected by the running state detection sensor and calculating stop-degree estimating parameters corresponding to the respective stop-degree estimating elements, and vehicle stop-degree calculation means for calculating a stop-degree of the vehicle from the stop-degree estimating parameters calculated by the stop-degree estimating parameter calculation means, and may be structured such that the vehicle stop determination means determines whether the vehicle has stopped, based on the stop-degree of the vehicle calculated by the vehicle stop-degree calculation means.

In this structure, a corresponding stop-degree estimating element is calculated from the signal detected by the running state detection sensor, and a stop-degree estimating parameter is calculated from the calculated stop-degree estimating element. In addition, the stop-degree of the vehicle is calculated from the stop-degree estimating parameter. Thereby it becomes possible to numerically evaluate the probability of a stopped state of the vehicle by referring to the magnitude of the stop-degree, unlike a method of the related art in which the stop of the vehicle is estimated by directly using a vehicle speed or a brake pressure indicated by signals of various running state detection sensors including a vehicle speed sensor and a brake pressure sensor. Thus, the stop of the vehicle can be estimated with higher reliability. In other words, the stop of the vehicle can be estimated more precisely irrespective of abrasion of the brake pads or fluctuations of vehicle weight. As a result, the neutral control can suitably be performed.

Also, the stop-degree of the vehicle can be calculated with weights of the respective stop-degree estimating parameters being evaluated. Thus, the stop-degree can be calculated with the evaluations of the respective stop-degree estimating parameters being suitably changed depending on the conditions characteristic of the vehicle, such as fluctuations of vehicle weight or abrasion of the brake pads. As a result, the control can be performed with extremely high precision.

The control apparatus may be structured such that the running state detection sensor has a vehicle speed sensor and a brake pressure sensor.

In this structure, the stop-degree estimating parameter can be calculated from a sensor whose signal can relatively easily be retrieved, such as a vehicle sensor or a brake pressure sensor. Hence, the stop-degree of the vehicle can be calculated with ease.

The control apparatus may be structured such that the stop-degree estimating elements are (1) an elapsed time after estimation of stop of the vehicle, (2) a brake pressure, and (3) a deceleration of the vehicle.

In this structure, the stop-degree can be obtained with higher reliability by adopting the elapsed time and the deceleration as the stop-degree estimating elements.

The control apparatus may be structured such that the running state detection sensor has a vehicle speed sensor and that the stop-degree estimating parameter calculation means calculates, as the stop-degree estimating element, an elapsed time after a time when the vehicle speed sensor detects a vehicle speed of 0 and estimates stop of the vehicle, based on the vehicle speed detected by the vehicle speed sensor, and calculates a corresponding stop-degree estimating parameter from the elapsed time.

In this structure, the elapsed time after the time when the vehicle is estimated to have stopped can be obtained as the stop-degree estimating element from the signal of the vehicle speed sensor.

The control apparatus may be structured such that the stop-degree estimating parameter calculation means calculates, as the stop-degree estimating element, an average brake pressure for a predetermined length of time prior to detection of a vehicle speed of 0 by the vehicle speed sensor, from an output from the brake pressure sensor, and calculates a corresponding stop-degree estimating parameter from the average brake pressure.

In this structure, the average brake pressure for the predetermined length of time can be obtained as the stop-degree estimating element from the signals of the vehicle sensor and the brake pressure sensor.

The control apparatus may be structured such that the running state detection sensor has a vehicle speed sensor and that the stop-degree estimating parameter calculation means calculates, as the stop-degree estimating element, an average deceleration for a predetermined length of time prior to detection of a vehicle speed of 0 by the vehicle speed sensor, from an output from the vehicle speed sensor, and calculates a corresponding stop-degree estimating parameter from the average deceleration.

In this structure, the average deceleration for the predetermined length of time can be obtained as the stop-degree estimating element from the signal of the vehicle speed sensor.

BRIEF DESCRIPTION OF THE DRAWINGS

The foregoing and further objects, features and advantages of the invention will become apparent from the following description of a preferred embodiment with reference to the accompanying drawings, wherein.

DETAILED DESCRIPTION OF PREFERRED EMBODIMENTS

An embodiment of the invention will be described with reference to the drawings.

A control apparatus for an automatic transmission (hereinafter referred to simply as the "control apparatus") in accordance with the invention will be described in the following sequence.

First of all the mechanical structure of the automatic transmission 1 fitted with the control apparatus will be schematically described. Next, the operation based on the structure will be described. The structure and operation of a hydraulic pressure control circuit of the automatic transmission will partially be described, focusing on those parts which are relevant to the invention. Further, the structure of the control apparatus in accordance with the invention, namely, the control apparatus for controlling the hydraulic pressure control circuit, will be described.

Figure 1:
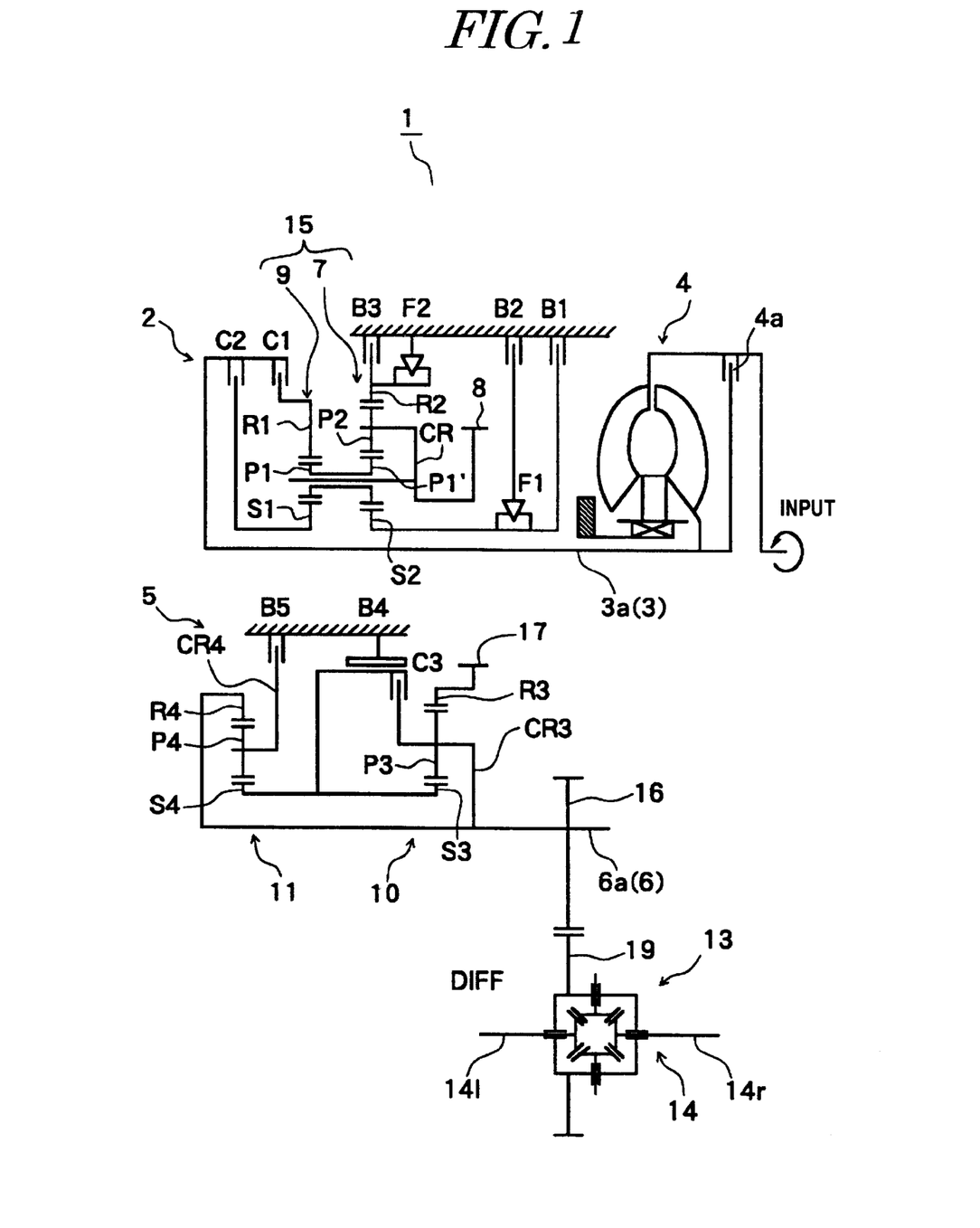
FIG. 1 is a schematic diagram showing an example of an automatic transmission.

FIG. 1 is a skeleton diagram showing an automatic transmission 1 fitted with a control apparatus for the automatic transmission in accordance with the invention. The automatic transmission 1, shown in FIG. 1, is an automatic transmission with five forward stages and one backward stage.

The automatic transmission 1 is mainly composed of a torque converter 4, a three-speed primary speed-change mechanism 2, a three-speed secondary speed-change mechanism 5 and a differential device 13, which are sequentially arranged along the direction of power transmission from the engine side (an upper right section in FIG. 1) to the wheel side (a lower section in FIG. 1). These components are interconnected to one another and accommodated in a monoblock casing. The monoblock casing rotationally supports three shafts which are arranged in alignment with a crank shaft, namely, a first shaft 3 (more specifically an input shaft 3a), a second shaft 6 (a counter shaft 6a) parallel to the first shaft 3, and a third shaft 14 (left and right axles 14l, 14r). A valve body is disposed outside the monoblock casing.

The torque converter 4 contains oil for power transmission and has a lock-up clutch 4a. A rotational force from the engine crank shaft is inputted to the primary speed-change mechanism 2 through flow of the oil (fluid connection) or mechanical connection of the lock-up clutch 4a.

The primary speed-change mechanism 2 has a planetary gear unit 15 composed of a simple planetary gear 9 and a double pinion planetary gear 7. The simple planetary gear 9 is composed of a sun gear S1, a ring gear R1, and a carrier CR supporting a pinion P1 engaging the gears S1, R1. On the other hand, the double pinion planetary gear 7 is composed of a sun gear S2, a ring gear R2 and a common carrier CR. The common carrier CR supports a pinion P1' engaging the sun gear S2 and a pinion P2 engaging the ring gear R2 with the pinions P1', P2 engaging each other.

The input shaft 3a interlocked with the thus-structured planetary gear unit 15 through the torque converter 4 from the engine crank shaft can be coupled to the ring gear R1 of the simple planetary gear 9 through a first (forward) clutch C1, and can be coupled to the sun gear S1 through a second (direct) clutch C2. The sun gear S2 can directly be engaged with a first brake B1, and can be engaged with a second brake B2 through a first one-way clutch F1. In addition, the ring gear R2 of the double pinion planetary gear 7 can be engaged with a third brake B3 and a second one-way clutch F2. The common carrier CR is coupled to a counter drive gear 8 serving as an output member of the primary speed-change mechanism 2.

In the secondary speed-change mechanism 5, an output gear 16, a first simple planetary gear 10 and a second simple planetary gear 11 are sequentially arranged rearwards in the axial direction of the counter shaft 6a constituting the second shaft 6. The counter shaft 6a is rotatably supported on the side of the monoblock casing through a bearing. The first and second simple planetary gears 10, 11 are of Simpson type and have the following structure.

The first simple planetary gear 10 has a ring gear R3 coupled to a counter driven gear 17 engaging the counter drive gear 8 and a sun gear S3 rotatably supported by the counter shaft 6a. A pinion P3 is supported by a carrier CR3 composed of a flange integrally coupled to the counter shaft 6a. The carrier CR3 supporting the pinion P3 is coupled to an inner hub of a UD direct clutch C3.

The second simple planetary gear 11 has a sun gear S4 coupled to the sun gear S3 of the first simple planetary gear 10 and a ring gear R4 coupled to the counter shaft 6a. The UD direct clutch C3 is interposed between the carrier CR3 of the first simple planetary gear 10 and the coupled sun gears S3, S4. The coupled sun gears S3, S4 can be engaged with a fourth brake B4, which is a band brake. In addition, a carrier CR4 supporting a pinion P4 of the second simple planetary gear 11 can be engaged with a fifth brake 135.

The aforementioned brakes B1 through B5 and one-way clutch F2 are directly mounted to an inner surface (indicated by diagonals in FIG. 1) of the monoblock casing.

The differential device 13 is disposed on the third shaft 14 formed of a front axle and has a ring gear 19 engaging the output gear 16. The differential device 13 divides a rotational speed from the ring gear 19 into left and right rotational speeds and transmits them to the left and right front axles 14l, 14r respectively.

Next, the operation of the automatic transmission I based on the aforementioned structure will be described.

Figure 2:
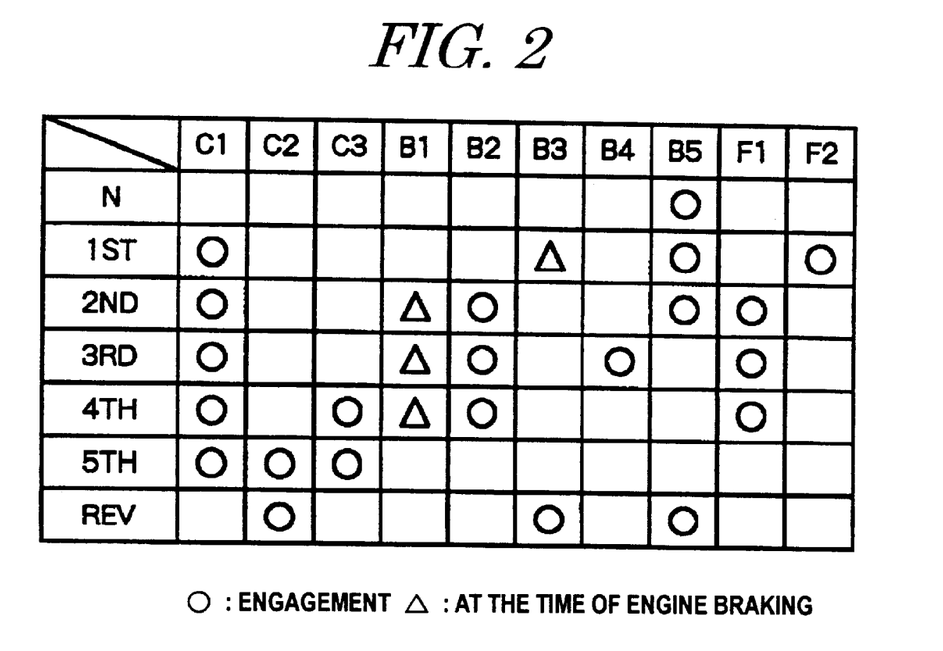
FIG. 2 is an operation table of the automatic transmission shown in FIG. 1.

In a first speed (1ST) state in a D (drive) range, the forward clutch C1 is engaged, the second one-way clutch F2 and the fifth brake B5 operate, and the ring gear R2 of the double pinion planetary gear 7 and the carrier CR4 of the second simple planetary gear 11 are kept stopped. In this state, a rotational speed of the input shaft 3a is transmitted to the ring gear R1 of the simple planetary gear 9 through the forward clutch C1, and the ring gear R2 of the double pinion planetary gear 7 is stopped. Thus, while the sun gears S1, S2 are idle-rotated in opposite directions, the common carrier CR is rotated in the positive direction with a drastic deceleration. That is, the primary speed-change mechanism 2 is in the first speed state, and the decelerating rotational speed is transmitted to the ring gear R3 of the first simple planetary gear 10 in the secondary speed-change mechanism 5 through the counter gears 8, 17. The secondary speed-change mechanism 5 is in the first speed state with the carrier CR4 of the second simple planetary gear 11 being stopped by the fifth brake B5. A decelerating rotational speed of the primary speed-change mechanism 2 is further decelerated by the secondary speed-change mechanism 5 and outputted from the output gear 16.

At the time of engine braking in the first speed, the third brake B3 operates. In a second speed (2ND) state, the second brake B2 operates in addition to the forward clutch C1, and the operation is further switched from the second one-way clutch F2 to the first one-way clutch F1, and the fifth brake B5 is kept in operation. In this state, the sun gear S2 is stopped by the second brake B2 and the first one-way clutch F1. Thus, a rotational speed of the ring gear R1 of the simple planetary gear 9 that has been transmitted from the input shaft 3a through the forward clutch C1 rotates the carrier CR in the positive direction with a deceleration, while idle-rotating the ring gear R2 of the double pinion planetary gear 7. The decelerated rotational speed is further transmitted to the secondary speed-change mechanism 5 through the counter gears 8, 17. That is, the primary speed-change mechanism 2 is in the second speed state, whereas the secondary speed-change mechanism 5 is in the first speed state due to the engagement of the fifth brake B5. The second speed state and the first speed state are combined with each other, whereby the second speed is obtained in the automatic transmission 1 as a whole.

At the time of engine braking in the second speed, the first brake B1 operates. The same holds true at the time of engine braking in third and fourth speeds which will be described later.

In a third speed (3RD) state, the forward clutch C1, the second brake B2 and the first one-way clutch F1 remain engaged, whereas the fifth brake B5 is disengaged and the fourth brake B4 is engaged. That is, the primary speed-change mechanism 2 is maintained as it is, and the aforementioned rotational speed in the second speed state is transmitted to the secondary speed-change mechanism 5 through the counter gears 8, 17. In the secondary speed-change mechanism 5, a rotational speed from the ring gear R3 of the simple planetary gear 10 is outputted from the carrier CR3 as a second rotational speed because of the fixation of the sun gear S3. Thus, the second speed in the primary speed-change mechanism 2 and the second speed in the secondary speed-change mechanism 5 establish the third speed in the automatic transmission 1 as a whole.

In a fourth speed (4TH) state, the primary speed-change mechanism 2 is in the same state as the aforementioned second and third speed states wherein the forward clutch C1, the second brake B2 and the one-way clutch F1 are engaged. In the secondary speed-change mechanism 5, the fourth brake B4 is disengaged and the UD direct clutch C3 is engaged. In this state, the sun gears S3, S4 and the ring gear R3 of the first simple planetary gear 10 are coupled to one another, whereby direct-coupled rotation is achieved. In other words, the planetary gears 10, 11 rotate integrally. Thus, the second speed of the primary speed-change mechanism 2 is combined with the direct coupling (the third speed) of the secondary speed-change mechanism 5, whereby the fourth rotational speed is outputted from the output gear 16 in the automatic transmission as a whole.

In a fifth speed (5TH) state, the forward clutch C1 and the direct clutch C2 are engaged, and a rotational speed of the input shaft 3 is transmitted to both the sun gear S1 and the ring gear R1 of the simple planetary gear 9. The primary speed-change mechanism 2 achieves direct-coupled rotation wherein both the gear units 7, 9 rotate integrally. Also, the secondary speed-change mechanism 5 achieves direct-coupled rotation wherein the UD direct clutch C3 is engaged. Thus, the third speed (direct coupling) of the primary speed-change mechanism 2 and the third speed (direct coupling) of the secondary speed-change mechanism 5 are combined with each other, whereby the fifth rotational speed is outputted from the output gear 16 in the automatic transmission as a whole.

In a R (reverse) range, the operation is switched depending on whether the vehicle speed is higher or lower than 7 Km/h. If the vehicle coasts forward at a speed equal to or higher than 7 Km/h, the primary speed-change mechanism 2 rotates freely, as in a N (neutral) range. If the vehicle is substantially stopped at a speed equal to or lower than 7 Km/h, the direct clutch C2 and the third brake B3 are engaged, and the fifth brake B5 is engaged. In this state, a rotational speed of the input shaft $3a$ is transmitted to the sun gear S1 through the direct clutch C2, and the ring gear R2 of the double pinion planetary gear 7 is stopped by the third brake B3. Therefore, while the ring gear R1 of the simple planetary gear 9 is idle-rotated reversely, the carrier CR also rotates reversely. This reverse rotation is transmitted to the secondary speed-change mechanism 5 through the counter gears 8, 17. The carrier CR4 of the second simple planetary gear 11 is also stopped in the reverse rotational direction based on the fifth brake B5, and the secondary speed-change mechanism 5 is maintained in the first speed state. Thus, the reverse rotation of the primary speed-change mechanism 2 and the first speed rotation of the secondary speed-change mechanism 5 are combined with each other, whereby a reversely decelerating rotational speed is outputted from the output shaft 16.

The control apparatus for the automatic transmission in accordance with the invention is mounted to the automatic transmission I which is structured and operates as described above, and performs neutral control. To be more specific, in the first speed state of the forward range (the D range) in FIG. 2, the first clutch C1 shown in FIGS. 1 and 2 is suitably controlled through a hydraulic pressure control circuit which will be described next.

Figure 4:
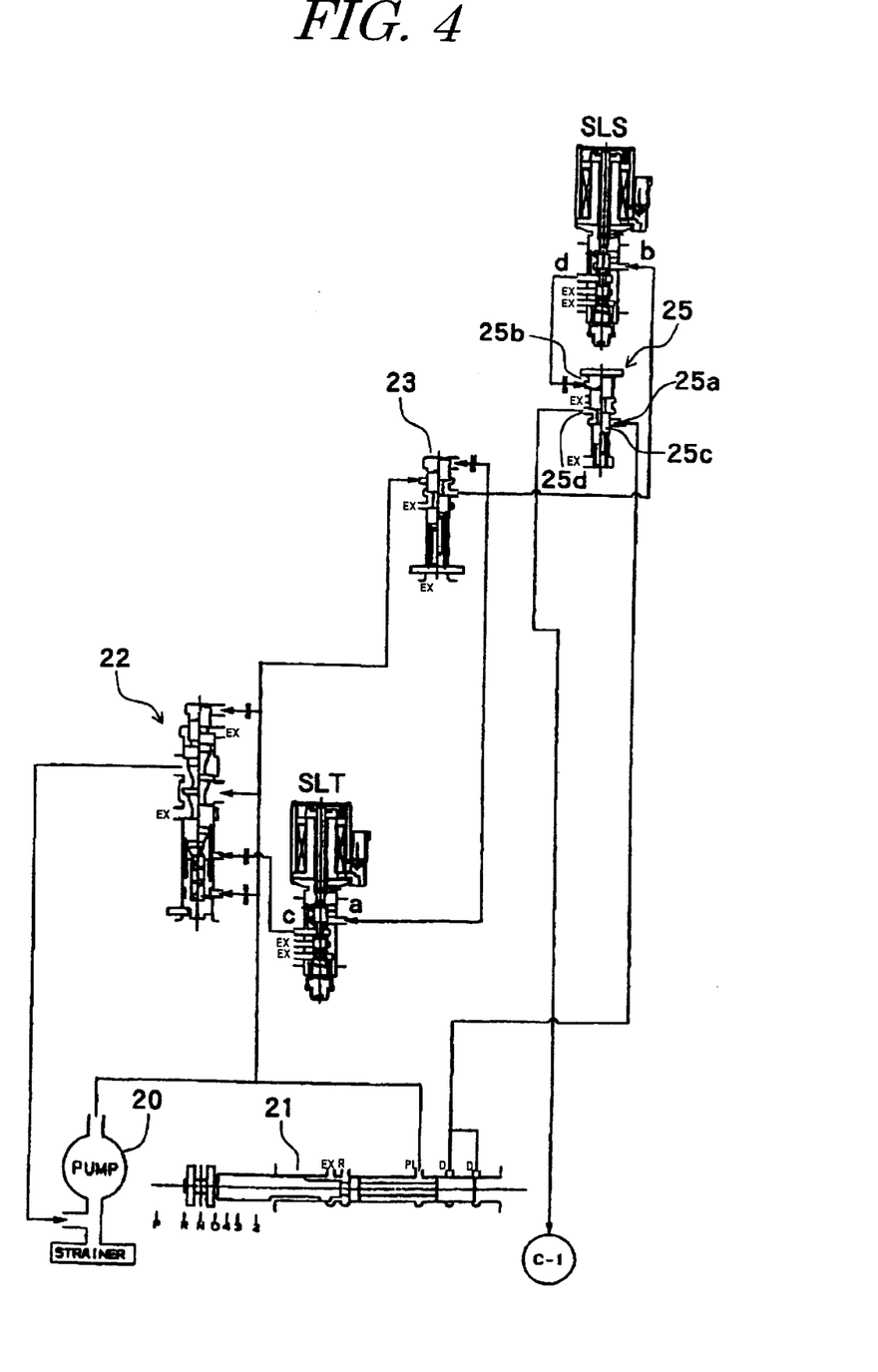
FIG. 4 shows an example of a hydraulic circuit associated with a hydraulic servo of a C1 clutch.

FIG. 4 shows such a part of a hydraulic pressure circuit employed in the aforementioned automatic transmission 1 as is relevant to the invention, namely, as is used for the neutral control.

A manual valve 21, a primary regulator valve 22 and a modulator valve 23 are connected to an oil pump 20. Linear solenoid valves SLT, SLS are connected to the modulator valve 23. A C1 control valve 25 is connected to the linear solenoid valve SLS. A hydraulic servo C-1 for driving a C1 clutch as an input clutch is connected to the C1 control valve 25.

A hydraulic pressure generated in the oil pump 20 is adjusted to a line pressure by the primary regulator valve 22 and supplied to the manual valve 21 and the modulator valve 23. The modulator valve 23 reduces the line pressure and supplies it to respective input ports a, b of the linear solenoid valves SLT, SLS. The linear solenoid valves SLT, SLS output control hydraulic pressures corresponding to the supply of electricity to the primary regulator valve 22 and the C1 control valve 25 from output ports c, d respectively.

A line pressure from the manual valve 21 is supplied to an input port $25a$ of the C1 control valve 25. The line pressure is regulated by a spool $25c$ which is movably driven by a control pressure inputted to a port $25b$ from the linear solenoid valve SLS.

That is, the hydraulic pressure which is supplied to the hydraulic servo C-1 in response to the supply of electricity to the linear solenoid valve SLS is regulated. Thereby an engaging force of the C1 clutch is adjusted.

Figure 3:
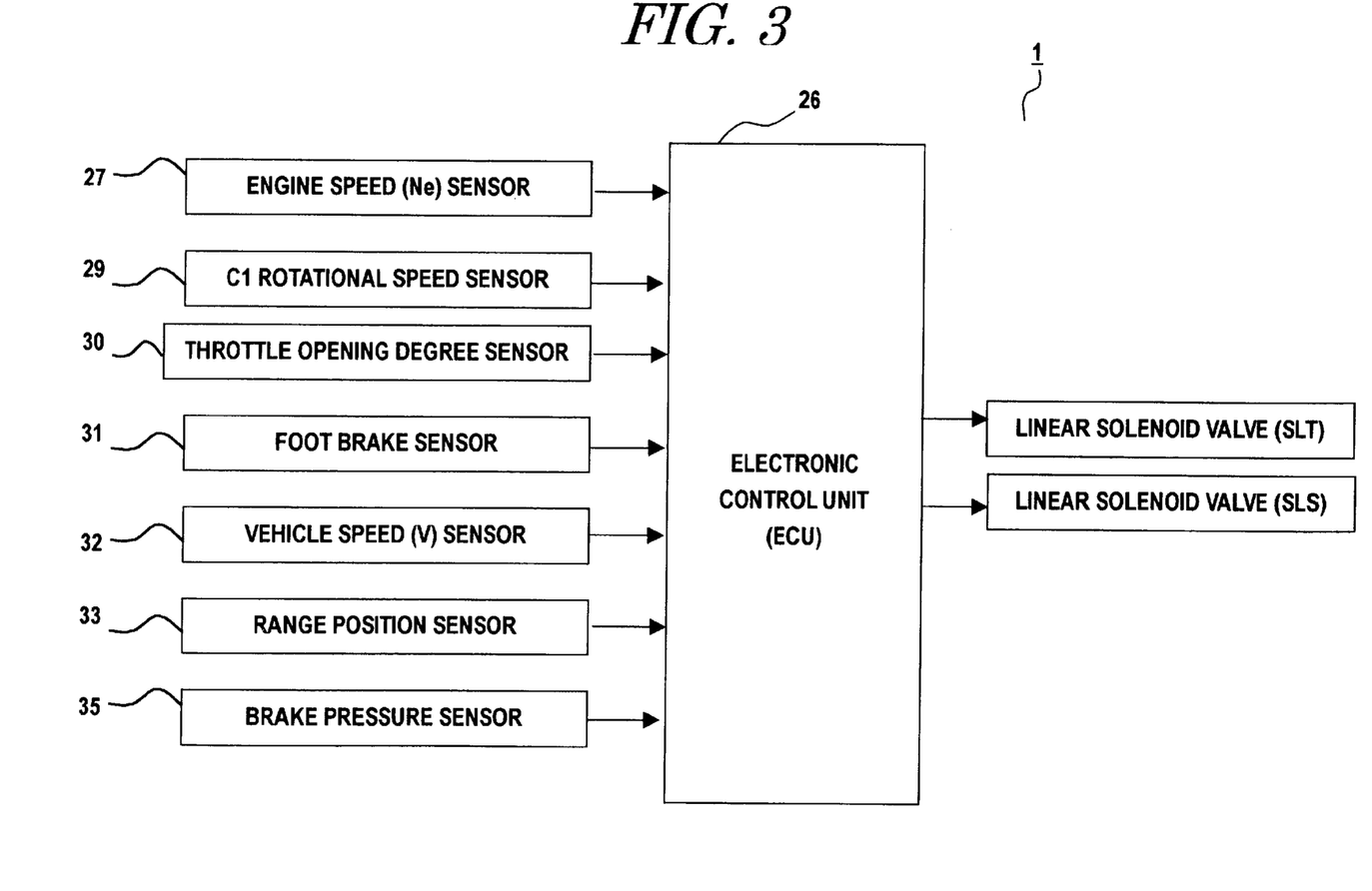
FIG. 3 is a block diagram showing an example of a control apparatus for the automatic transmission.

FIG. 3 shows an electric block diagram of the control apparatus for the automatic transmission in accordance with the invention.

Signals from an engine speed (Ne) sensor 27, a C1 rotational speed sensor 29, a throttle opening degree sensor 30, a foot brake sensor 31, a vehicle speed sensor 32, a range position sensor 33, and a brake pressure sensor 35 are inputted to an electronic control unit 26. The C1 rotational speed sensor 29 detects a rotational speed of the C1 clutch, that is, an input rotational speed (Nin) of the transmission. In addition, the linear solenoid valves SLT, SLS are connected to the output side of the electronic control unit 26.

If a driver depresses the brake while the vehicle travels in a forward drive range, the control apparatus for the automatic transmission detects a signal of the foot brake sensor 31 and executes a neutral control program NPR stored in a suitable memory.

Figure 5:
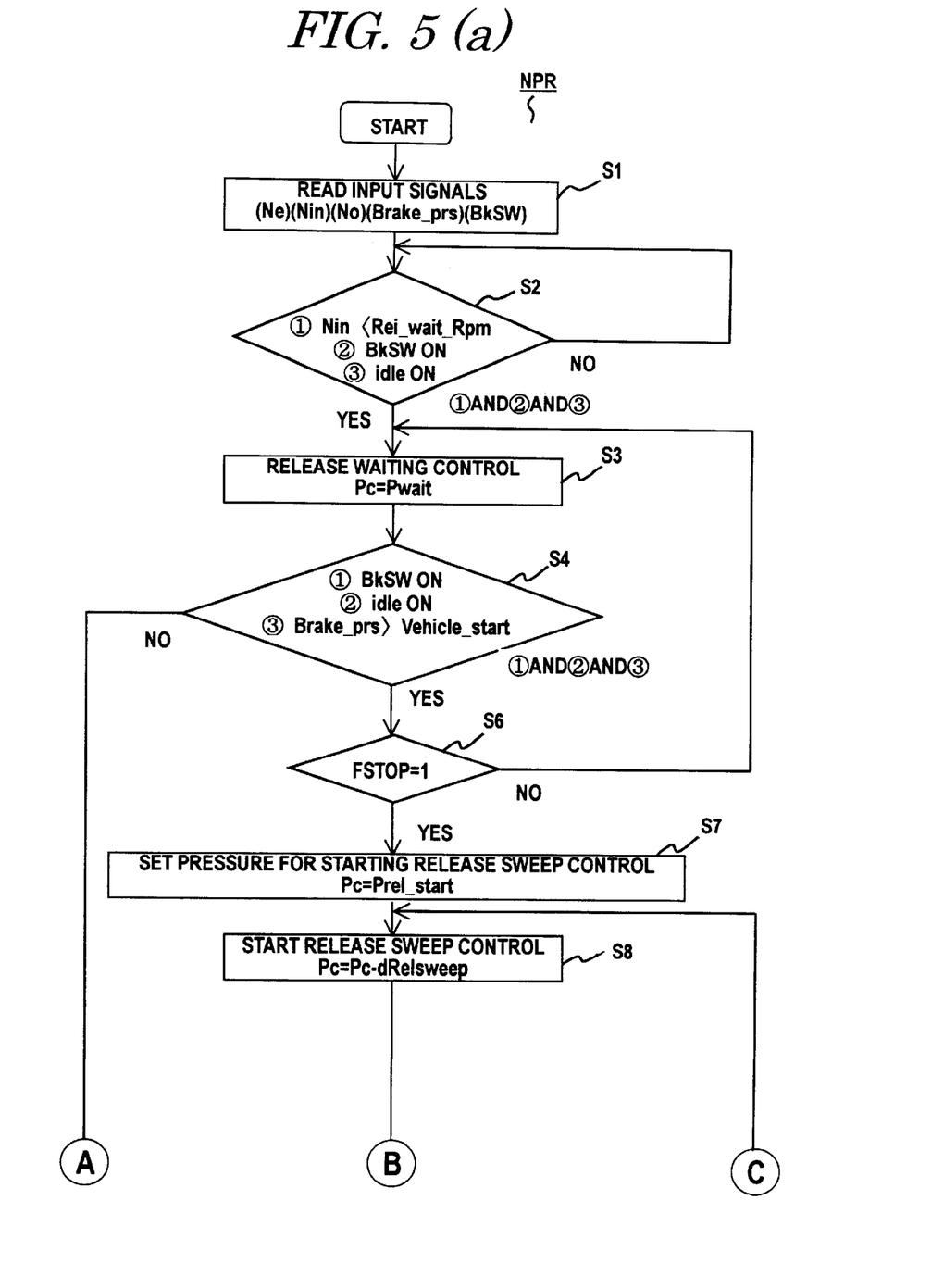
FIG. 5 is a flowchart showing an example of a neutral control program.
Figure 5B:
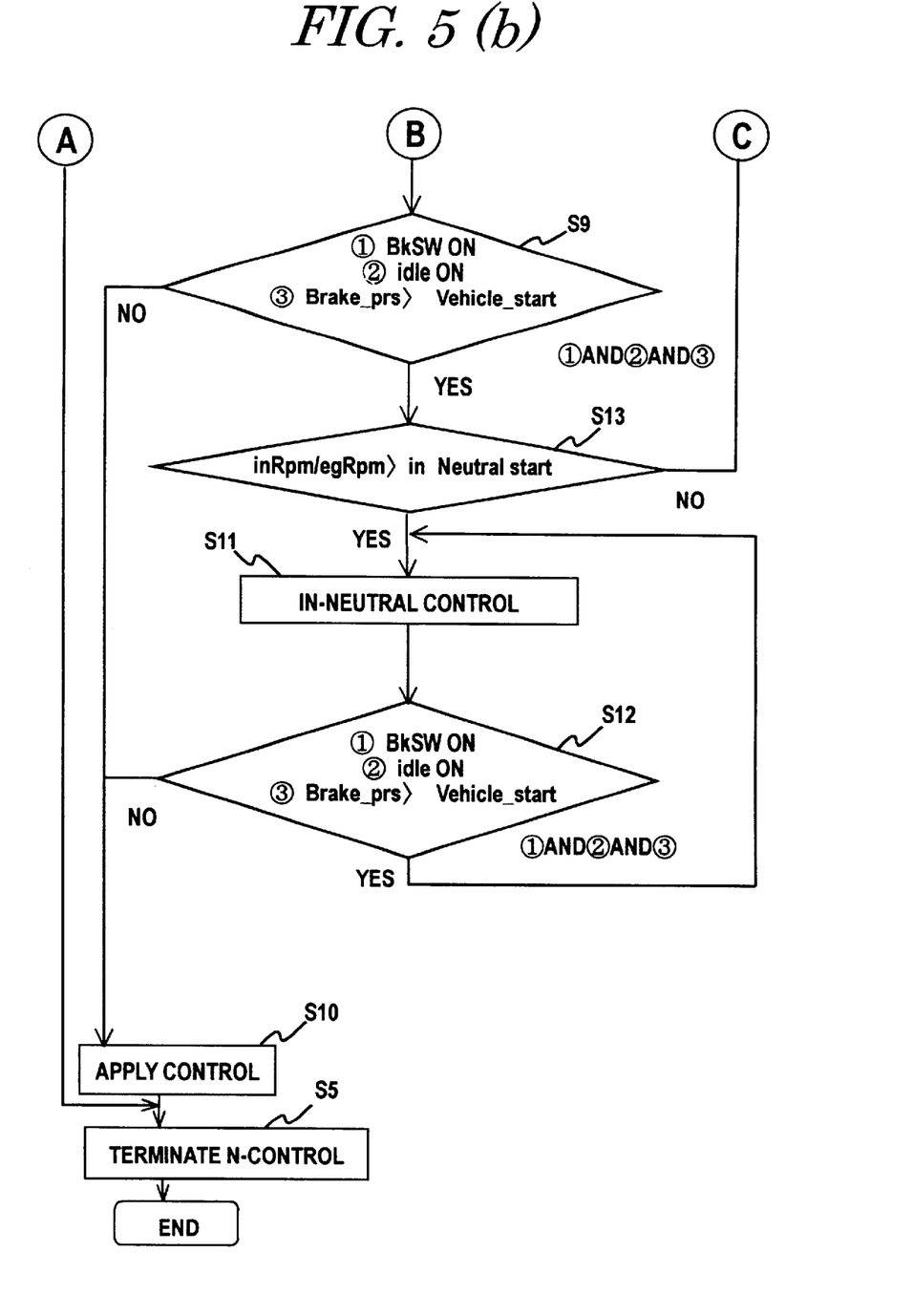

In step S1 of the neutral control program NPR shown in FIG. 5, an engine speed Ne is detected and read from a signal of the engine speed sensor 27, a transmission input rotational speed Nin from the C1 rotational speed sensor 29, an output shaft rotational speed No from the vehicle speed sensor 32, a brake pressure Brake-prs from the brake pressure sensor 35, the presence or absence BkSW of depression of the brake from the foot brake sensor 31, and a depression amount of an accelerator from the throttle opening degree sensor 30. It is determined in step S2 whether a condition for starting release waiting control is established.

The release waiting control is started when the following three conditions are all established. The first condition is that the transmission input rotational speed Nin has dropped to a predetermined waiting control starting rotational speed Rel-wait-Rpm, namely, that the vehicle speed is above zero but has dropped to a speed immediately before the stop of the vehicle. The second condition is that the signal Bksw from the foot brake sensor 31 is ON with the brake being depressed. The third condition is that the signal of the throttle opening degree sensor 30 indicates a throttle opening degree substantially equal to zero, namely, an idle- ON state.

If it is determined in step S2 that the release waiting control starting conditions are established (at a timing T1 in FIG. 6), the electronic control unit 26 judges that a vehicle stop predicting condition capable of predicting immediate stop of the vehicle has been established. Then the electronic control unit 26 proceeds to step S3 and enters the release waiting control. In step S3, the hydraulic pressure supplied to the hydraulic servo C-1 through the C1 control valve 25 is reduced through the linear solenoid valve SLS, from a normal engaging pressure (line pressure) P-relSt of the C1 clutch to a waiting pressure Pwait which is a pressure immediately before disengagement of the C1 clutch (from the timing T1 to a timing T2 in FIG. 6). The waiting pressure Pwait is a value obtained by adding an allowance value α to a stall torque calculated from a current engine speed Ne. By driving the hydraulic servo C-1 of the C1 clutch at the waiting pressure Pwait, the C1 clutch is maintained in a state immediately before slippage.

Figure 9:
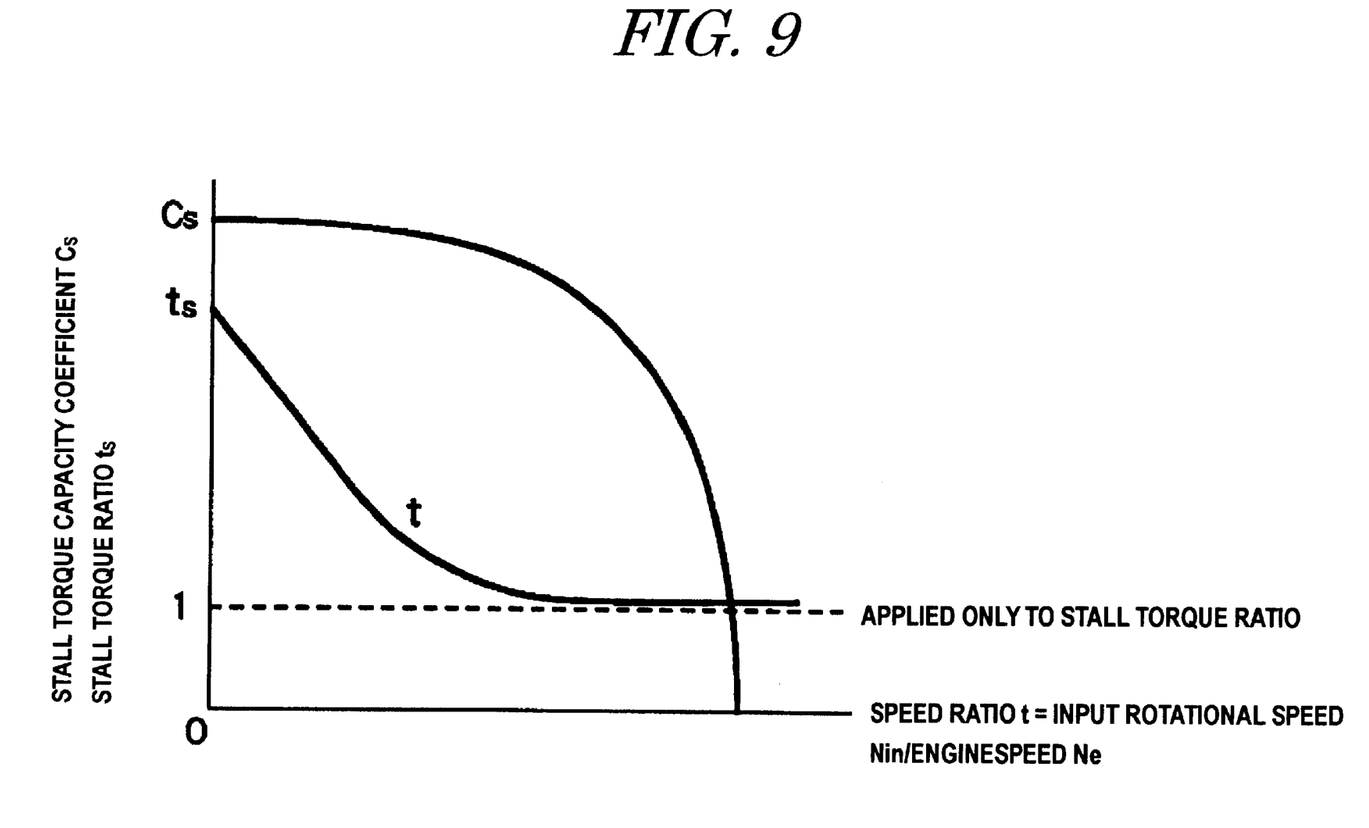
FIG. 9 shows a relationship among speed ratio, stall torque ratio and stall torque capacity coefficient.

The engine speed Ne is measured momently. Thus, if the engine speed Ne changes, the stall torque also changes. Hence, every time the engine speed Ne changes, the waiting pressure Pwait also changes. As shown in FIG. 9, the aforementioned stall torque is calculated by multiplying a stall torque ratio (ts) by a stall torque capacity coefficient (Cs) and a square of a current engine speed Ne. The stall torque ratio (ts) is a value when the input rotational speed Nin calculated from a speed ratio (t) by means of a map is zero. The speed ratio (t) is obtained from the engine speed Ne and the input rotational speed Nin. By the same token, the stall torque capacity coefficient (Cs) is a value when the input rotational speed Nin calculated from the speed ratio (t) is zero. That is, the following formula is established.

$$Ts = ts \times Cs \times Ne^2.$$

Thus, the waiting pressure can be calculated using the following formula.

$$Pwait = Ts/X + Y + \alpha$$

Where

X: effective radius of piston×area of piston×number of frictional members×friction coefficient of frictional members;

Y: stroke pressure of piston, and α: allowance value.

In this manner, as soon as the hydraulic servo C-1 of the C1 clutch is maintained at the waiting pressure Pwait, the electronic control unit 26 proceeds to step S4 and determines whether the vehicle continues to decelerate and is about to stop, by checking whether the following three conditions are established. The first condition is that the signal Bksw of the foot brake sensor 31 is ON with the brake being depressed. The second condition is that the signal of the throttle opening degree sensor 30 indicates a throttle opening degree substantially equal to zero, namely, an idle-ON state. The third condition is that the signal of the brake pressure sensor 35 indicates the brake pressure Brake-prs which is greater than a predetermined pressure, namely, a brake pressure Vehicle-start immediately before take-off of the vehicle. If any one of these conditions is judged to be unestablished, i.e., not met, the electronic control unit 26 cancels the decelerating state of the vehicle and determines that the vehicle will not stop soon. Thus, the electronic control unit 26 proceeds to step S5 and terminates the neutral control.

Figure 7:
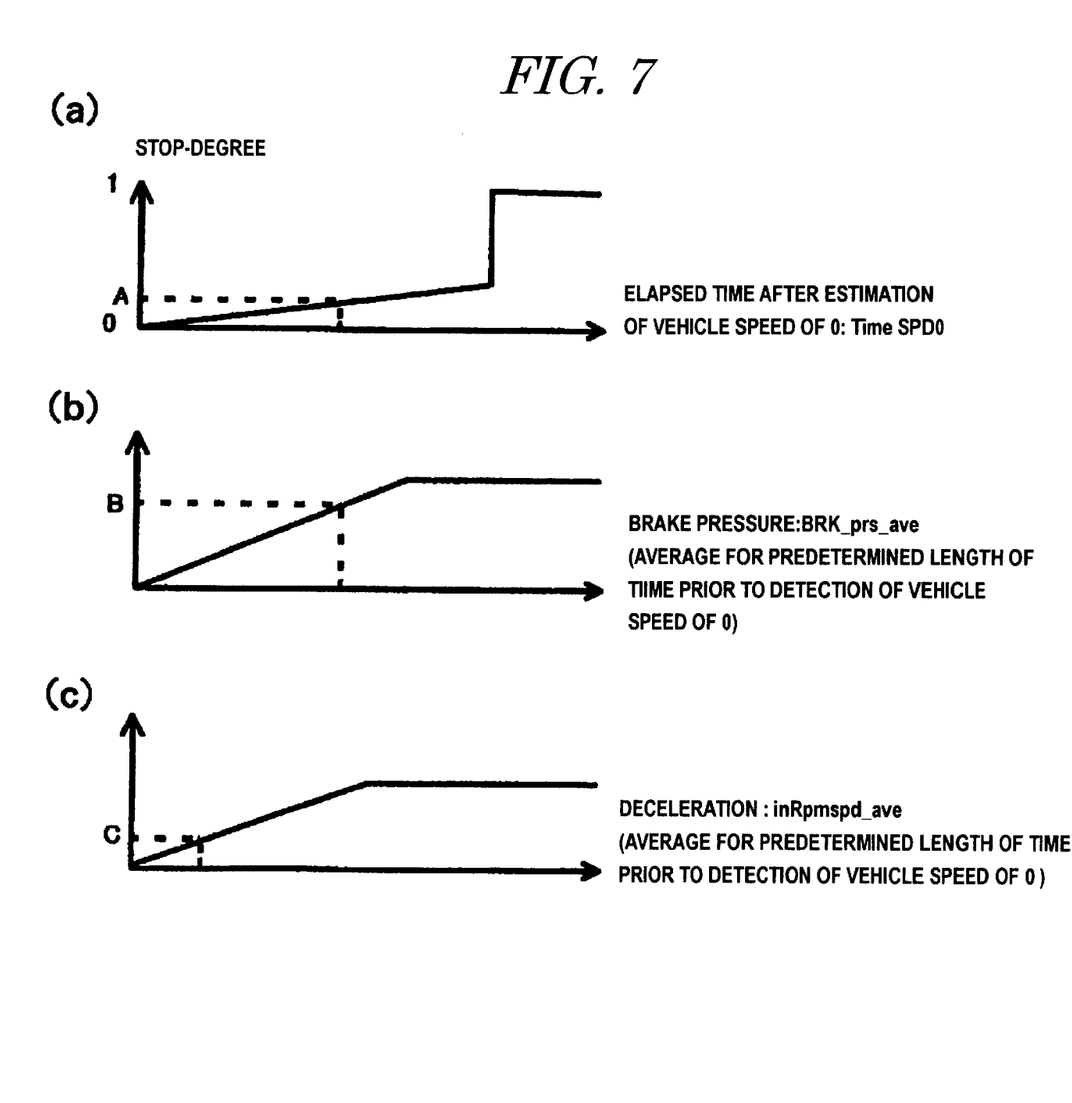
FIG. 7 shows relationships among elapsed time after estimation of a vehicle speed of 0, brake pressure, deceleration and various parameters.

If it is determined in step S4 that the vehicle continues to decelerate and is about to stop, the electronic control unit 26 proceeds to step S6 and makes a calculation for estimating a stop-degree of the vehicle. As shown in FIG. 7, this calculation is made as to three stop-degree estimating elements. That is, the first stop-degree estimating element is an elapsed time TimeSPD0 after a timing when the vehicle speed sensor 32 detects a vehicle speed of zero and estimates that the vehicle has stopped (even though the vehicle speed is actually not zero, it is regarded as equal to zero because of a detection limit of the sensor), as is apparent from FIG. 7(a). As the elapsed time TimeSPD0 increases, a later-described parameter A indicative of a stop-degree of the vehicle increases. The second stop-degree estimating element is a brake pressure BRK-prs-ave detected by the brake pressure sensor 35, that is, an average brake pressure for a predetermined length of time before the vehicle speed sensor 32 detects a vehicle speed of 0. If the brake pressure BRK-prs-ave is high, it is judged that there is a great braking force acting. Hence, as shown in FIG. 7(b), as the brake pressure BRK-prs-ave increases, a later-described parameter B indicative of a stop-degree of the vehicle increases. The third stop-degree estimating clement is a deceleration inRpmspd-ave of the vehicle calculated based on a vehicle speed detected by the vehicle speed sensor 32, that is, an average deceleration for a predetermined length of time before the vehicle speed sensor 32 detects a vehicle speed of zero. As shown in FIG. 7(c), as the deceleration inRpmspd-ave increases, a later-described parameter C indicative of a stop-degree of the vehicle increases.

Figure 8:
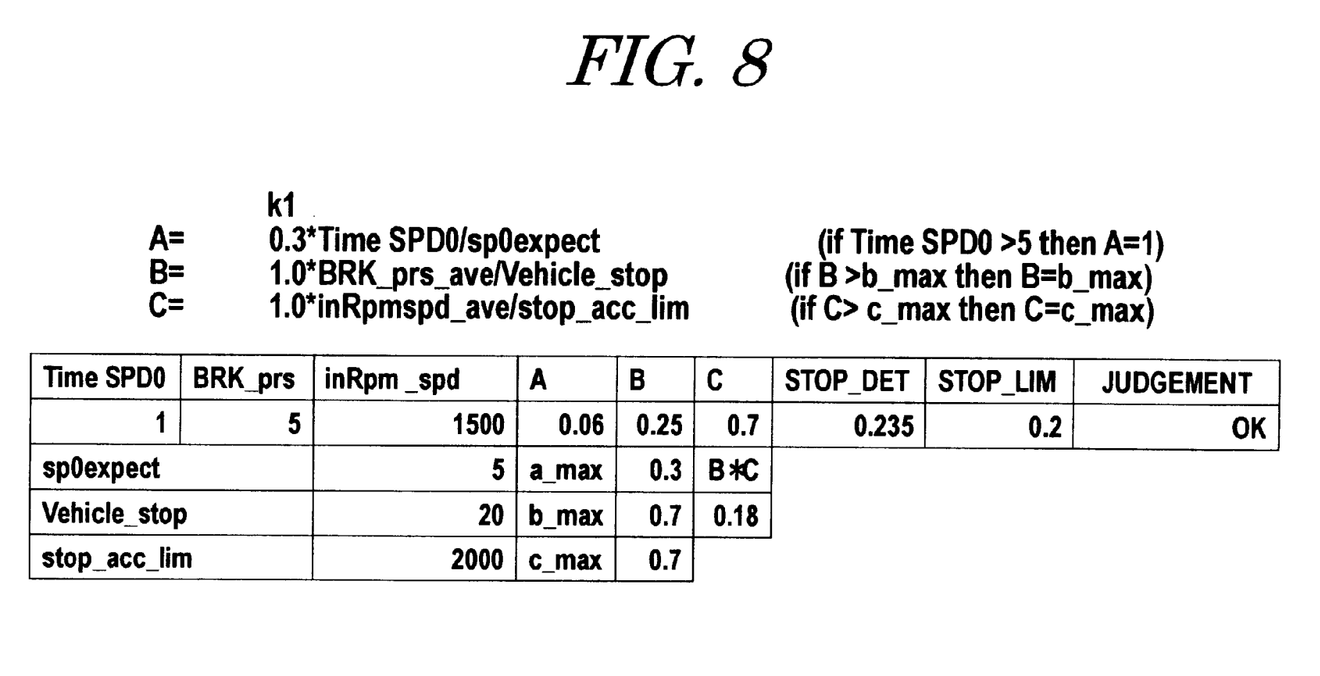
FIG. 8 shows an example of calculation formulas of various parameters.

Using these three stop-degree estimating elements, the electronic control unit 26 makes the following calculations as shown in FIG. 8.

A=0.3 *TimeSPD0e/sp0expect
B=1.0 *BRK-prs-ave/Vehicle-stop
C=1.0 *inRpmspd-ave/stop-acc-lim In this manner, the electronic control unit 26 calculates the stop-degree estimating parameters A, B and C which correspond to the respective elements and are made dimensionless. FIG. 8 shows concrete values of the constants sp0expect, Vehicle-stop, stop-acc-lim in the respective formulas, upper limit values of the respective parameters A, B and C, and the like.

After the respective parameters A, B and C have thus been calculated, the electronic control unit 26 calculates a stop-degree STOP-DET of the vehicle using the following formula.

$$STOP\text{-}DET = A + (B \times C)$$

The electronic control unit 26 compares the calculated stop-degree STOP-DET with a predetermined value STOP- LIM, and switches a stop estimation flag FTSTOP from 0 to 1 if STOP-DET>STOP-LIM.

Then, the electronic control unit 26 proceeds from step S6 to step S7 in the neutral control program NPR in FIG. 5, and sets a start pressure to Pc=P-rel-start. When releasing the hydraulic servo C-1 of the C1 clutch from the waiting pressure, release sweep control is started at the start pressure P-rel-start. At the same time, sweep control is started in step S8. As soon as the stop estimation flag FTSTOP is set to 1 at a timing T3, the hydraulic pressure supplied to the hydraulic servo C-1 of the C1 clutch is abruptly reduced from the waiting pressure Pwait. At a timing T4 when the hydraulic pressure becomes equal to the start pressure Pc=P-rel-start set in step S7, the hydraulic pressure is gently reduced. This prevents a shock from being caused as a result of the release of the C1 clutch. The operation of releasing the C1 clutch from the waiting pressure Pwait is started based on the stop-degree STOP-DET. The stop-degree STOP-DET is calculated based on the relevant stop-degree estimating parameters which are calculated from a plurality of stop-degree estimating elements. The stop-degree estimating elements include the elapsed time TimeSPD0 after a timing when the vehicle speed sensor 32 detects a vehicle speed of zero and estimates that the vehicle has stopped, the brake pressure BRK-prs-ave detected by the brake pressure sensor 35, and the deceleration inRpmspd of the vehicle calculated based on a vehicle speed detected by the vehicle speed sensor 32. Therefore, in comparison with a case of the related art where the operation of releasing the C1 clutch is performed by simply referring to a vehicle speed, a brake pressure and the like, it is possible to make a judgement with due consideration for an inconsistency in stop timing resulting from fluctuations of vehicle weight or abrasion of brake pads. Thus, it is possible to reliably determine whether the vehicle has stopped. As a result, it is possible to prevent circumstances in which the C1 clutch is released before the vehicle stops, the engine driving force transmitted from the side of the torque converter 4 to the primary speed-change mechanism 2 designed as a speed-change mechanism portion is blocked, the braking force balanced with the engine driving force transmitted to the speed-change mechanism portion becomes excessive due to the blocking of the engine driving force, and the vehicle stops all of a sudden.

In the same manner as in step S4, the electronic control unit 26 determines in step S9 whether the vehicle is kept stopped. That is, the electronic control unit 26 determines whether the following three conditions are established. The first condition is that the signal Bksw of the foot brake sensor 31 is ON with the brake being depressed. The second condition is that the signal of the throttle opening degree sensor 30 indicates a throttle opening degree substantially equal to zero, namely, an idle-ON state. The third condition is that the signal of the brake pressure sensor 35 indicates the brake pressure Brake-prs which is greater than a predetermined pressure, namely, a brake pressure Vehicle-start immediately before take-off of the vehicle. If these conditions are judged to be uinestablished, that is, if the brake has been released, or if the accelerator has been depressed, or if the brake pressure has dropped below a predetermined value, it is determined that the stopped state of the vehicle has been canceled. The electronic control unit 26 then proceeds to step S10, starts performing apply control for again supplying the hydraulic servo C-1 of the C1 clutch with a hydraulic pressure, and terminates the neutral control in step S5.

If it is determined in step S9 that the stopped state of the vehicle is maintained, the electronic control unit 26 proceeds to step S13. The C1 rotational speed sensor 29 monitors that the C1 clutch is disengaged in accordance with a decrease in the hydraulic pressure supplied to the hydraulic servo C-1 of the C1 clutch in step S8 and that the rotational speed of the C1 clutch rises. It is determined in step S13 whether the ratio of the rotational speed inRpm of the C1 clutch to the engine speed egRpm has exceeded a value inNeutralStart for starting in-neutral control. At a timing T5 (see FIG. 6) when the ratio of the rotational speed inRpm of the C1 clutch to the engine speed egRpm exceeds the value inNeutralStart for starting in-neutral control, the electronic control unit 26 proceeds to step S11 and starts performing the in-neutral control.

During the in-neutral control, the hydraulic pressure supplied to the hydraulic servo C1 of the C1 clutch is controlled so that the C1 clutch assumes a state immediately before engagement. In this state, because the C1 clutch is disengaged, the output of the torque converter 4 is not inputted to the three-speed primary speed-change mechanism 2. Although the transmission is in a forward drive range, the driving force of the engine is not inputted to the speed-change mechanism portion. Thus, fuel consumption is improved.

Figure 6:
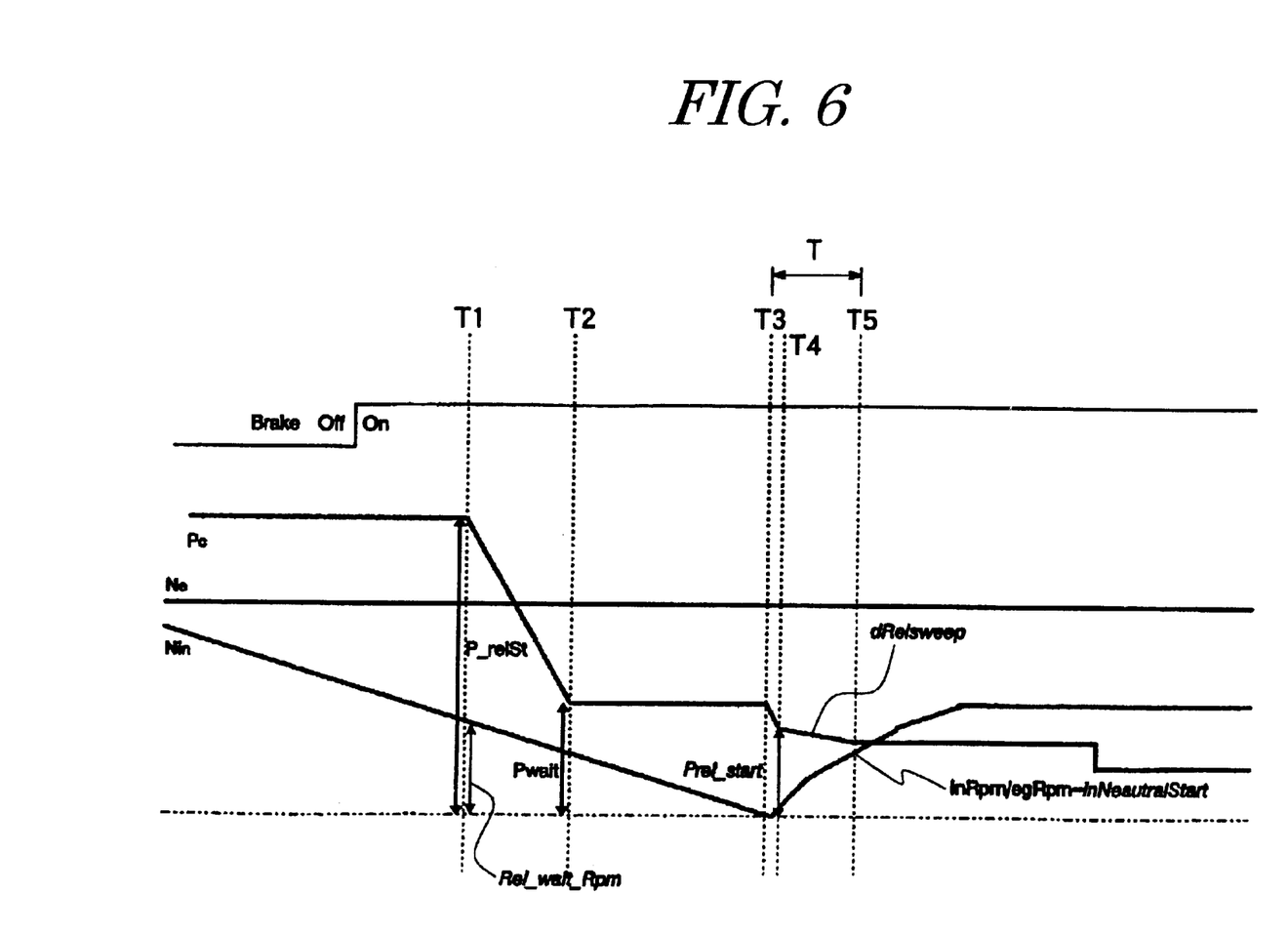
FIG. 6 is a time chart showing a hydraulic pressure of the hydraulic servo of the C1 clutch, an engine speed, an input rotational speed of a transmission, and a state of a brake sensor at the time of neutral control.

When starting the operation of releasing the C1 clutch, the hydraulic pressure in the hydraulic servo C1 of the C1 clutch is preliminarily reduced to the waiting pressure Pwait in step S3. Thus, the time T starting with the timing T3 when the stop estimation flag FTSTOP is set to 1 and ending with the timing T5 when the in-neutral control is entered can be drastically reduced in comparison with the case of the related art wherein the reduction is made from a line pressure. The in-neutral control is started in a short period of time after the estimation of the stop of the vehicle, whereby it becomes possible to improve fuel consumption accordingly.

While continuing the in-neutral control in step S11, the electronic control unit 26 makes a judgement similar to those in steps S4, S9 in step S12, and determines whether the stopped state of the vehicle is maintained. That is, while the following three conditions are established, the electronic control unit 26 determines that the vehicle is stopped and continues the in-neutral control. The first condition is that the signal Bksw of the foot brake sensor 31 is ON with the brake being depressed. The second condition is that the signal of the throttle opening degree sensor 30 indicates a throttle opening degree substantially equal to zero, namely, an idle-ON state. The third condition is that the signal of the brake pressure sensor 35 indicates the brake pressure Brake-prs which is greater than a predetermined pressure, namely, a brake pressure Vehicle-start immediately before take-off of the vehicle. If these conditions become unestablished, that is, if the brake has been released, or if the accelerator has been depressed, or if the brake pressure has dropped below the predetermined value, it is determined that the stopped state of the vehicle has been canceled. The electronic control unit 26 then proceeds to steps S10, S5, immediately supplies the hydraulic servo C-1 of the C1 clutch with a hydraulic pressure, and terminates the neutral control.

The condition for starting the release waiting control wherein a hydraulic pressure in the hydraulic servo C-1 of the C1 clutch is reduced from a line pressure, which is a hydraulic pressure in a normal engagement state, to the waiting pressure Pwait is not limited to the vehicle stop predicting condition shown in step S2. As long as the vehicle speed has dropped to a speed immediately before the stop of the vehicle and it can be predicted that the vehicle will stop soon, any condition may be used.

In addition, the stop-degree estimating elements, which constitute the base of the stop-degree estimating parameters used in estimating a stop-degree of the vehicle in step S6, are not limited to: (1) the elapsed time TimeSPD0 after the timing when it is estimated that the vehicle has stopped, (2) the brake pressure BRK-prs-ave, or (3) the deceleration inRpmspd-ave. As long as a stop-degree of the vehicle can be estimated, any element concerning a running state of the vehicle can be used. Further, the calculation formula used to evaluate the respective stop-degree estimating parameters for calculating the stop-degree is not limited to the aforementioned STOP-DET=A+(B×C). As long as the respective parameters can be suitably evaluated, any calculation formula can be used. Needless to say, the stop-degree can also be calculated with the evaluation of the respective parameters being changed in accordance with a momentary state of the vehicle, such as a vehicle weight or a degree of abrasion of brake pads.

As described in the aforementioned embodiment, the neutral control can be used not only when the vehicle travels forwards but also when the vehicle travels in reverse. As a matter of course, the invention can be applied to the case where the vehicle travels in reverse.

In addition, although the input clutch C1 may be disposed between the torque converter 4 and a first-stage speed-change gear unit, such as the planetary gear unit 9 of the speed-change mechanism portion as shown in FIG. 1, the input clutch C1 can be disposed at any location in the speed-change mechanism portion as long as the transmission of the engine driving force can be on-off controlled.

While the invention has been described with reference to what is presently considered to be a preferred embodiment thereof, it is to be understood that the invention is not limited to the disclosed embodiment or stricture. On the contrary, the invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the invention.

What is claimed is:

1. A control apparatus for an automatic transmission performing neutral control in which an input clutch for on-off controlling transmission of an engine driving force is released when a vehicle is stopped in a drive range, comprising:

a vehicle speed sensor for detecting a vehicle speed;

vehicle stop prediction means for predicting immediate stop of the vehicle from the vehicle speed detected by the vehicle speed sensor; and input clutch control means for reducing a hydraulic pressure in a hydraulic servo of the input clutch when the vehicle speed before the stop of the vehicle is detected by the vehicle stop prediction means from a hydraulic pressure in a normal engagement state to a predetermined waiting pressure capable of maintaining the engagement state of the input clutch and for reducing the hydraulic pressure when the stop of the vehicle is detected from the hydraulic pressure of the predetermined waiting pressure.

2. The control apparatus according to claim 1, comprising:

a brake sensor for detecting presence or absence of depression of a brake, wherein the vehicle stop prediction means predicts stop of the vehicle from the presence or absence of depression of the brake detected by the brake sensor in addition to the vehicle speed detected by the vehicle speed sensor.

3. The control apparatus according to claim 1, comprising:

a throttle opening degree sensor for detecting an opening degree of a throttle, wherein the vehicle stop prediction means predicts stop of the vehicle from the opening degree of the throttle detected by the throttle opening degree sensor in addition to the vehicle speed detected by the vehicle speed sensor.

4. The control apparatus according to claim 1, wherein the input clutch control means reduces a hydraulic pressure in the hydraulic servo of the input clutch from a line pressure to a predetermined waiting pressure capable of maintaining an engagement state of the input clutch.

5. The control apparatus according to claim 1, wherein the input clutch control means reduces a hydraulic pressure in the hydraulic servo of the input clutch from a hydraulic pressure in a normal engagement state to a predetermined waiting pressure based on a stall torque calculated from an engine at that moment.

6. The control apparatus according to claim 1, comprising:

vehicle stop determination means, wherein when the vehicle stop determination means determines that the vehicle has stopped, the operation of releasing the input clutch concurrent with the neutral control is started from a state of the waiting pressure.

7. The control apparatus according to claim 6, comprising:

a running state detection sensor capable of detecting a signal corresponding to a plurality of stop-degree estimating elements for estimating a stop-degree of the vehicle;

stop-degree estimating parameter calculation means for calculating a corresponding stop-degree estimating element from the signal detected by the running state detection sensor and calculating stop-degree estimating parameters corresponding to the respective stop-degree estimating elements; and vehicle stop-degree calculation means for calculating a stop-degree of the vehicle from the stop-degree estimating parameters calculated by the stop-degree estimating parameter calculation means, wherein the vehicle stop determination means determines whether the vehicle has stopped, based on the stop-degree of the vehicle calculated by the vehicle stop-degree calculation means.

8. The control apparatus according to claim 7, wherein the running state detection sensor has a vehicle speed sensor and a brake pressure sensor.

9. The control apparatus according to claim 7, wherein the stop-degree estimating elements are: (1) an elapsed time after estimation of stop of the vehicle, (2) a brake pressure, and (3) a deceleration of the vehicle.

10. The control apparatus according to claim 7, wherein the running state detection sensor has a vehicle speed sensor; and the stop-degree estimating parameter calculation means calculates, as the stop-degree estimating element, an elapsed time after a timing when the vehicle speed sensor detects a vehicle speed of 0 and estimates stop of the vehicle, based on the vehicle speed detected by the vehicle speed sensor, and calculates a corresponding stop-degree estimating parameter from the elapsed time.

11. The control apparatus according to claim 8, wherein the stop-degree estimating parameter calculation means calculates, as the stop-degree estimating element, an average brake pressure for a predetermined length of time prior to detection of a vehicle speed of 0 by the vehicle speed sensor, from an output from the brake pressure sensor, and calculates a corresponding stop-degree estimating parameter from the average brake pressure.

12. The control apparatus according to claim 7, wherein the running state detection sensor has a vehicle speed sensor; and the stop-degree estimating parameter calculation means calculates, as the stop-degree estimating element, an average deceleration for a predetermined length of time prior to detection of a vehicle speed of 0 by the vehicle speed sensor, from an output from the vehicle speed sensor, and calculates a corresponding stop-degree estimating parameter from the average deceleration.

* * * * *